United States Patent
Okada et al.

[11] Patent Number: 5,861,133
[45] Date of Patent: Jan. 19, 1999

[54] SYNTHETIC CHALCOALUMITE COMPOUNDS AND PROCESS FOR PRODUCING THEREOF

[75] Inventors: Akira Okada, Takamatsu; Kanako Shimizu, Sakaide; Kazushige Oda, Kita-gun, all of Japan

[73] Assignee: Kyowa Chemical Industry Co., Ltd., Takamatsu, Japan

[21] Appl. No.: 807,987

[22] Filed: Mar. 3, 1997

[30] Foreign Application Priority Data

Mar. 5, 1996 [JP] Japan ................................. 8-073094
Feb. 14, 1997 [JP] Japan ................................. 9-044960

[51] Int. Cl.⁶ ..................................................... C01F 7/02
[52] U.S. Cl. .................... 423/306; 423/308; 423/327.1; 423/395; 423/397; 423/419.1; 423/420.2; 423/430; 423/431; 423/463; 423/493; 423/495; 423/519.2; 423/554; 423/556; 423/594; 423/595; 423/596; 423/600; 423/604; 423/625
[58] Field of Search ...................... 423/554, 556, 423/306, 308, 420.2, 431, 419.1, 430, 595, 596, 594, 600, 327.1, 519.2, 395, 397, 604, 625, 463, 493, 495

[56] References Cited

U.S. PATENT DOCUMENTS 4,415,555 11/1983 Anabuki et al. ..................... 423/420.2
4,436,833 3/1984 Broecker et al. ................... 423/420.2
5,518,704 5/1996 Kelkar et al. ....................... 423/420.2

*Primary Examiner*—Paul Marcantoni
*Attorney, Agent, or Firm*—Sherman and Shalloway

[57] ABSTRACT

A synthetic chalcoalumite compound represented by the formula (1)

$$(Zn_{a-x}^{2+}M_x^{2+})Al_4^{3+}(OH)_b(A^{n-})_c \cdot mH_2O \qquad (1)$$

wherein
$M^{2+}$ represents at least one of Cu, Ni, Co and Mg;
a represents $0.3 < a < 2.0$;
x represents $0 \leq x < 1.0$;
b represents $10 < b < 14$;
$A^{n-}$ represents one or two selected from $SO_4^{2-}$, $HPO_4^{2-}$, $CO_3^{2-}$, $CrO_4^{2-}$, $SiO_3^{2-}$, $NO_3^{2-}$, $OH^-$ and $Cl^-$;
c represents $0.4 < c < 2.0$ and
m represents a number of 1 to 4,
and a process for the production thereof.

5 Claims, 3 Drawing Sheets

FIG. 1

FIG. 3

SYNTHETIC CHALCOALUMITE COMPOUNDS AND PROCESS FOR PRODUCING THEREOF

DETAILED DESCRIPTION OF THE INVENTION

Industrially Applicable Field

This invention relates to novel chalcoalumite compounds and a process for producing thereof. More specifically, the invention relates to novel synthetic chalcoalumite compounds represented by the following formula (1) fit as neutralizers and inactivators of acidic substances remaining in resins or rubbers, infrared absorbers for agricultural films, antibacterial agents, deodorants, heat stabilizers of PVC and agents for removing phosphate ion and chromate ion contained in industrial waste water, and further for recording media for ink jet, and a process for producing thereof.

$$(Zn_{a-x}^{2+}M_x^{2+})Al_4^{3+}(OH)_b(A^{n-})_c \cdot mH_2O \qquad (1)$$

wherein $M^{2+}$ represents at least one of Cu, Ni, Co and Mg, a represents $0.3 < a < 2.0$, x represents $0 \leq x < 1.0$, b represents $10 < b < 14$, A represents one or two selected from $SO_4^{2-}$, $HPO_4^{2-}$, $CO_3^{2-}$, $CrO_4^{2-}$, $SiO_3^{2-}$, $SO_3^{2-}$, $NO_3^-$, $OH^-$ and $Cl^-$, c represents $0.4 < c < 2.0$ and m represents a number of 1 to 4.

Prior Art

It is known that the following substances exist in the nature as chalcoalumite compounds [see JCPDS (Joint Committee ON Powder Diffraction Standard) card].

Chalcoalumite: $CuAl_4SO_4(OH)_{12} \cdot 3H_2O$

Mbobomkulite: $(Ni,Cu)Al_4[(NO_3)_2(SO_4)](OH)_{12} \cdot 3H_2O$

Nickelalumite: $(Ni,Cu)Al_4[(SO_4)(NO_3)](OH)_{12} \cdot 3H_2O$

Problems to be Solved by the Invention

Figure 2:
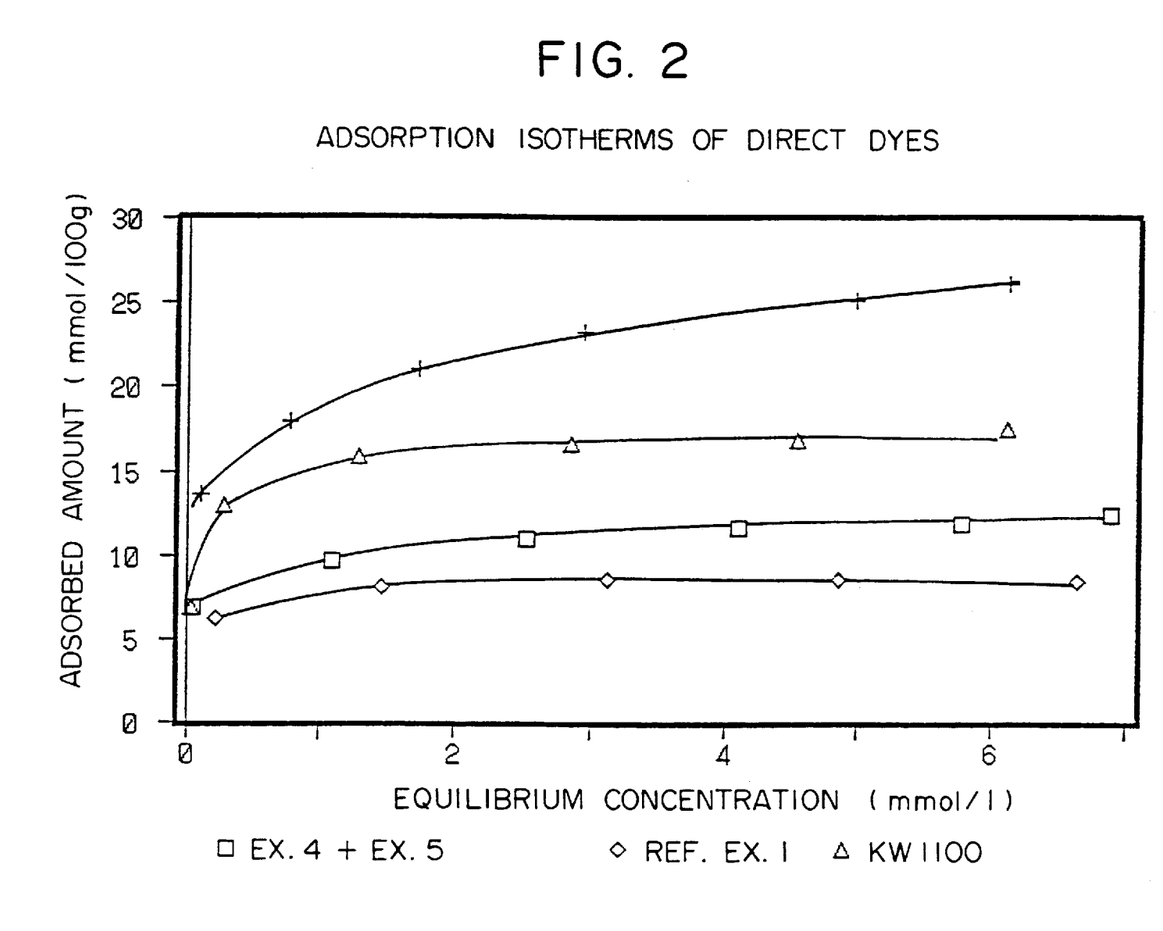
FIG. 2 exhibits adsorption ithotherms of a direct dye (Chlorazol Black LF, $C_{35}H_{27}N_9Na_2O_7S_2$) on the synthetic chalcoalumite compounds of Example 4, Example 5 and Reference example 1 and KW-1100 (hydrotalcite having anion exchange ability, $Mg_{4.5}Al_2(OH)_{13}CO_3.3.5H_2O$, an article on the market from Kyowa Chemical Industry Co., Ltd.) (adsorption condition: treatment at 30° C. for 6 hours).

The present inventors have researched into physicochemical characteristics of the above-mentioned chalcoalumite compounds, and have found several interesting properties. Namely, a chalcoalumite compound has such crystal structure that a divalent cation partially occupies the vacancy of aluminum hydroxide having layer structure (Al(OH)$_3$:gibbsite), and sulfate ions and water molecules are contained between the layers of $[M^{2+}Al_4(OH)_{12}]^{2+}$ having positive electric charge, and it can be ascertained, from the fact that an anionic dye is adsorbed on the solid surface as shown in FIG. 2, that the surface has positive electric charge.

Cu and Ni are found as divalent metal elements constituting the chalcoalumite structure in natural minerals, whereas Zn alone, or Cu, Ni, Co or Mg each with Zn exists as divalent metal elements constituting the synthetic chalcoalumite compounds of the invention.

Thus, Zn, Cu, Ni, Co and Mg are confirmed as divalent metal elements capable of constituting chalcoalumite structure, and Zn and Cu each can constitute by itself chalcoalumite structure, or they can constitute chalcoalumite structure in such a form that they are mutually substituted for each other. There can also exist a compound of chalcoalumite structure wherein Zn and/or Cu exist(s) as main metal(s) and part thereof is displaced by Ni, Co and/or Mg.

Further, in the composition of the above formula (1) showing the synthetic chalcoalumite compounds of the invention, part of the anion ($A^{n-}$) has ion exchange ability, and an anion close to $SO_4^{2-}$ and $NO_3^-$ in the shape and size of the anion can substitute for $SO_4^{2-}$ or $NO_3^-$. As anions capable of being substituted, there can be mentioned anions ($HPO_4^{2-}$, $CrO_4^{2-}$) forming tetrahedral structure, anions ($CO_3^{2-}$, $NO_3^-$) forming plane triangle structure, and anions ($SO_3^{2-}$) forming equilateral trigonal pyramid structure.

Among the synthetic chalcoalumite compounds of the invention having the composition represented by the above formula (1), those wherein the anion ($A^{n-}$) in the formula (1) is $SO_4^{2-}$, $NO_3^-$ or $Cl^-$ or the like have large solubilities, and it is possible to control the solubilities of the synthetic chalcoalumite compounds in aqueous systems by substituting other anions such as, representatively, $CO_3^{2-}$, $SO_3^{2-}$ and $OH^-$ for these anions.

Natural chalcoalumite compounds containing Cu and/or Ni as divalent metal element(s) have color specific to the element(s) and therefore are low in utilization value, but they can be utilized for uses such as antibacterial agents, deodorants or flame retardants for resins.

On the other hand, the synthetic chalcoalumite compounds of the invention containing Zn alone or mainly Zn metal as divalent metal element(s) have not hitherto been known at all, and since they are colorless, low in toxicity and comparatively inexpensive, they have high utilization value, and are fit for various uses, for example as infrared absorbers for agricultural films, heat stabilizers of PVC, ink jet recording media (fastening of water soluble anionic dyes), neutralizers and inactivators of acidic substances remaining in resins or rubbers, and further for removal of phosphate ion and chromate ion contained in industrial waste water, and for carrying dyes or antibacterial substances thereon, etc.

Thus, the colorless synthetic chalcoalumite compounds of the invention which contain Zn alone or mainly Zn metal as divalent metal element(s) can be utilized for broader uses, compared with the usual natural chalcoalumite compounds.

The characteristics of the synthetic chalcoalumite compounds of the invention wherein part or all of the divalent metal elements constituting chalcoalumite structure are displaced with Zn, compared with $CuAl_4$-type or $(Cu, Ni)Al_4$-type chalcoalumite compounds existing in the nature, are mentioned as follows.

(i) their color is paler than that of natural ones, or white (colorless system)

(ii) Co, Ni and Cu are elements having high catalytic activities, and have strong action to accelerate the decomposition or deterioration of organic compounds or polymers contacting therewith. Substitution of Zn therefor gives stabler and safer compounds which can be utilized for various resins.

(iii) The synthetic chalcoalumite compounds (Zn, Al$_4$ type) of the invention are stable compounds. Namely, chalcoalumite compounds containing Cu, or Cu and Ni as a component, which compounds also exist in natural minerals, are unstable, and for example, it is confirmed that when such a compound is subjected to anion exchange treatment with an aqueous sodium carbonate solution, its crystal structure is destroyed (see Reference example 1).

Thus, the first object of the invention is to provide novel synthetic chalcoalumite compounds of the colorless system containing zinc alone or mainly zinc metal as a divalent metal element.

The second object of the invention is to provide novel synthetic chalcoalumite compounds of the colorless system containing zinc alone or mainly zinc metal as a divalent metal element, which compounds have positive charge on the solid surface and specific anion exchange ability.

The third object of the invention is to provide novel synthetic chalcoalumite compounds of the colorless system containing zinc alone or mainly zinc metal as a divalent metal element, the solubilities of the compounds in water being controlled.

The fourth object of the invention is to provide synthetic chalcoalumite compounds stabler and safer than chalcoalumite compounds existing in the nature.

The fifth object of the invention is to provide an advantageous process for producing the above-mentioned novel synthetic chalcoalumite compounds.

Still other objects of the invention will be apparent from the following description.

Means for Solving the Problems

It has been found that the above objects of the invention can be accomplished by a synthetic chalcoalumite compound represented by the formula (1)

$$(Zn_{a-x}^{2+}M_x^{2+})Al_4^{3+}(OH)_b(A^{n-})_c \cdot mH_2O \quad (1)$$

wherein $M^{2+}$ represents at least one of Cu, Ni, Co and Mg, a represents $0.3 < a < 2.0$, x represents $0 \leq x < 1.0$, b represents $10 < b < 14$, $A^{n-}$ represents one or two selected from $SO_4^{2-}$, $OH^-$ and $Cl^-$, c represents $0.4 < c < 2.0$ and m represents an integer of 1 to 4, and a process for producing a synthetic chalcoalumite compound of the above formula (1) which comprises subjecting a water soluble aluminum salt, a zinc compound which is water soluble in the pH range of about 4 to about 7, and if necessary, a compound of one or more elements selected from Ni, Cu, Co and Mg which compound is water soluble in the pH range of about 4 to about 7, to coprecipitation reaction at a reaction pH of about 4 to about 7 and a temperature of about 10° to about 50° C. and then subjecting the coprecipitate to hydrothermal reaction at a reaction pH of the above-mentioned range and a temperature of about 80° to about 170° C., or a process for producing a synthetic chalcoalumite compound of the above formula (1) which comprises producing a chalcoalumite compound of the above formula (1) wherein $A^{n-}$ is $SO_4^{2-}$, and then displacing part of $SO_4^{2-}$ of the compound with one anion selected from $HPO_4^{2-}$, $CO_3^{2-}$, $CrO_4^{2-}$, $SiO_3^{2-}$, $SO_3^{2-}$, $NO_3^-$, $OH^-$ and $Cl^-$.

The synthetic chalcoalumite compounds of the invention are more detailedly described below.

The synthetic chalcoalumite compounds of the invention having the compositions of the above formula (1) can be identified by composition analysis and a powder X-ray diffraction (XRD) method. Based on the JCPDS (Joint Committee ON Powder Diffraction Standards) card, main four lattice spacings (dÅ) are shown in the following table.

In each of the synthetic chalcoalumite compounds of the invention, superlattice based on the $Al(OH)_3$ (gibbsite) structure is formed, and a diffraction line corresponding to the lattice plane (300) of the compound is detected around $2\theta(Cu\ K_a\text{-ray})=62.4°$ to $62.6°$ by the XRD method, and this is a diffraction line based on the regular configuration of the Al atom of the above gibbsite structure.

TABLE 1

| Chalcoalumite compounds | JCPDS number | Lattice spacing (dÅ) | Chemical formula |
|---|---|---|---|
| Chalcoalumite | 25–1430 | $8.50_x\ 4.25_9\ 4.18_3\ 7.90_2$ | $CuAl_4SO_4(OH)_{12} \cdot 3H_2O$ |
| Chalcoalumite | 8–142 | $8.92_x\ 8.29_x\ 4.24_x\ 4.36_9$ | $CuAl_4SO_4(OH)_{12} \cdot 3H_2O$ |
| Mbobomkulite | 35–696 | $8.55_x\ 4.27_4\ 7.87_2\ 4.55_2$ | $(Ni,Cu)Al_4[(NO_3)_2(SO_4)](OH)_{12} \cdot 3H_2O$ |
| Nickelalumite | 35–698 | $8.54_x\ 4.27_6\ 7.88_2\ 2.00_2$ | $(Ni,Cu)Al_4[(NO_3)(SO_4)](OH)_{12} \cdot 3H_2O$ |

The synthetic chalcoalumite compounds of the invention can be produced by the following process. Namely, such a compound can be produced by subjecting a water soluble aluminum salt, a zinc compound which is water soluble in the pH range of about 4 to about 7, and if necessary, a compound of one or more elements selected from Ni, Cu, Co and Mg which compound is water soluble in the pH range of about 4 to about 7, to coprecipitation reaction at a reaction pH of about 4 to about 7 and a temperature of about 10° to about 50° C., preferably about 20° to about 40° C., and then subjecting the resultant coprecipitate to hydrothermal reaction at a reaction pH of the above-mentioned range and a temperature of about 80° to about 170° C., preferably about 100° to about 150° C.

As compounds of Zn, Ni, Cu, Co and Mg water soluble in the pH range of about 4 to about 7, and water soluble aluminum salts, which are used for production of the synthetic chalcoalumite compounds of the invention, there can, for example, be mentioned zinc compounds water soluble in the reaction pH range of about 4 to about 7 such as zinc chloride, zinc nitrate, zinc sulfate, zinc acetate and zinc oxide, nickel compounds such as nickel chloride, nickel sulfate, nickel nitrate and nickel acetate, copper compounds such as copper chloride, copper nitrate, copper sulfate and copper acetate, cobalt compounds such as cobalt chloride, cobalt nitrate and cobalt sulfate, magnesium compounds water soluble in the reaction pH range of about 4 to about 7 such as magnesium chloride, magnesium nitrate, magnesium sulfate and magnesium acetate, and further magnesium oxide and magnesium hydroxide, aluminum compounds such as aluminum chloride, aluminum nitrate, aluminum sulfate and sodium aluminate, etc.

As alkali compounds used for adjusting the reaction pH to the range of about 4 to about 7, there can be exemplified sodium hydroxide, potassium hydroxide, sodium carbonate, potassium carbonate, ammonia water, ammonia gas, magnesium oxide, magnesium hydroxide, basic magnesium carbonate, calcium hydroxide, etc., and these alkali compounds are used usually in an amount of 0.97 to 1.1 equivalents based on the total of the divalent metal ion(s) and the aluminum ion.

When a synthetic chalcoalumite compound of the invention is produced, it is necessary to carry out the reaction at a reaction pH of about 4 to about 7. When the reaction pH is about 4 or less, the solubility of the coprecipitate is increased to lower the yield, and when the reaction pH is about 7 or more, hydroxide(s) of the divalent metal(s) is/are formed, which causes formation of a mixture of hydrotalcite-type layer complex hydroxide(s) wherein part of the cation(s) of the hydroxide(s) of the divalent metal(s) is displaced with trivalent cation(s), with the hydroxide of aluminum.

When the reaction is carried out at an atomic ratio of the divalent metal ion(s) $[(Zn_{a-x}^{2+}M_x^{2+})$ of the formula (1)] to the $Al^{3+}$ ion, namely $(Zn_{a-x}^{2+}M_x^{2+})/Al^{3+}$ of 0.075 to 0.50, a crystalline chalcoalumite compound is formed. When, further preferably, the reaction is carried out at an atomic ratio thereof in the range of 0.15 to 0.37, a chalcoalumite compound extremely good in the growth of crystals is formed. The atomic ratio between $Zn^{2+}$ and $M^{2+}$ (Cu, Ni, Co, Mg) is preferably $0 \leq M^{2+}/Zn^{2+} < 0.5$.

In the production of the synthetic chalcoalumite compounds of the invention, the temperature of the coprecipitation reaction is not particularly limited, but it is economical to carry out the reaction at a temperature of about 10° to about 50° C. for about 10 minutes to about 2 hours, and preferably, the reaction is carried out at about 20° to about 40° C.

In the hydrothermal reaction, when the reaction temperature is about 80° C. or less, the formation of the chalcoalumite structure gets insufficient, and when it is about 170° C. or more, boehmite and $3Al_2O_3.4SO_3.10-15 H_2O$ are undesirably formed. The proper reaction time is usually about 1 to about 24 hours, preferably about 3 to about 12 hours.

Further, by producing first a chalcoalumite compound of the formula (1) wherein the anion ($A^{n-}$) is $SO_4^{2-}$, and then substituting one anion selected from $HPO_4^{2-}$, $CO_3^{2-}$, $CrO_4^{2-}$, $SiO_3^{2-}$, $SO_3^{2-}$, $NO_3^-$, $OH^-$ and $Cl^-$ for part of the $SO_4^{2-}$, a chalcoalumite compound containing the anion can readily be obtained.

The substitution reaction is carried out by adding a chalcoalumite compound of the formula (1) wherein the anion ($A^{n-}$) is $SO_4^{2-}$ to an aqueous solution of a salt of such an anion or an alkali metal hydroxide at a temperature of about 20° to about 80° C., and stirring the mixture for several minutes to about 1 hour. In this occasion, the salt of the anion or the alkali metal hydroxide is used in such an amount that the equivalent of the anion to the Al atom of the formula (1) gets to be 0.5 to 1.0.

The synthetic chalcoalumite compounds of the invention can be produced preferably according to the following process. Namely, such a compound can be produced by coprecipitation reacting an aqueous solution of sulfate(s), nitrate(s), or chloride(s), of one or more elements selected from Zn, Ni, Cu, Co, Mg and Al with one or more compounds selected from ammonia, sodium hydroxide, potassium hydroxide, magnesium hydroxide, magnesium oxide, sodium aluminate and zinc oxide, at a reaction pH of about 4 to about 7 and a temperature of about 10° to about 50° C., and then subjecting the resultant coprecipitate to hydrothermal reaction at a reaction pH of the above-mentioned range and a temperature of about 80° to about 170° C., preferably about 100° to about 150° C.

When a synthetic chalcoalumite compound of the invention is utilized as an additive for plastics, it is possible, for making its compatibility with resins, its processability, etc. better, to surface treat it with at least one surface-treating agent selected from the group consisting of higher fatty acids, anionic surfactants, phosphoric esters, silanes, titanates, aluminum coupling agents and fatty acid esters of polyhydric alcohols.

As surface-treating agent preferably used, there can specifically be mentioned higher fatty acids such as stearic acid, oleic acid, erucic acid, palmitic acid and lauric acid and alkali metal salts of these higher fatty acids; sulfate esters of higher alcohols such as stearyl alcohol and oleyl alcohol; anionic surfactants such as sulfate ester salts, amide bond sulfate ester salts, ether bond sulfonate salts, ester bond sulfonate salts, amide bond alkylarylsulfonate salts and ether bond alkylarylsulfonate salts; mono- or diesters between orthophosphoric acid and oleyl alcohol, stearyl alcohol or the like, or mixtures of these esters, or alkali metal salts or amine salts thereof; silane coupling agents such as vinylethoxysilane, vinyl-tris(2-methoxy-ethoxy)silane and γ-aminopropyltrimethoxysilane; titanate coupling agents such as isopropyl triisostearoyl titanate, isopropyl tris (dioctylpyrophosphate) titanate and isopropyl tridecylbenzenesulfonyl titanate; aluminum coupling agents such as acetoalkoxyaluminum diisopropylate; etc. As methods for surface treatment, there are a wet method and a dry method. In the wet method, such a surface-treating agent in a liquid or emulsion state is added to slurry of the synthetic chalcoalumite compound, and the mixture is sufficiently mixed under stirring at a temperature up to about 100° C. In the dry method, powder of the synthetic chalcoalumite compound is put in a mixer such as a Henschel mixer, the surface-treating agent in a liquid, emulsion or solid state is added, and the mixture is sufficiently mixed with or without heating. Preferably, the surface-treating agent is used in an amount of about 0.1 to about 15% by weight of the weight of the synthetic chalcoalumite compound.

Effect of the Invention

This invention provides such novel synthetic chalcoalumite compounds of the colorless system that the solid surfaces have positive charge, they have specific anion exchange ability and their solubility in water can be controlled, and the synthetic chalcoalumite compounds of the invention improved compared with so far known natural chalcoalumite compounds have higher utilization value, and their uses in various fields can be expected.

EXAMPLE

The invention is further detailedly described below based on examples.

Example 1

600 ml of 0.161 mol/L aqueous solution of aluminum sulfate of the first class grade was put in a 1-L beaker, and while the solution was vigorously stirred by a homomixer at room temperature, 4.73 g of zinc oxide (article on the market) and 14.11 g of magnesium hydroxide (article on the market) were added. The mixture was stirred for about 30 minutes, and the pH of the resultant coprecipitate suspension was 6.67 (27.1° C.). The suspension was then transferred into 0.98-L autoclave apparatus and subjected to hydrothermal reaction at 120° C. for 4 hours. The pH of the suspension after cooling was 6.17 (13.7° C.). The suspension was then filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by powder X-ray diffraction (XRD) measurement and chemical analysis.

Main lattice spacing (dÅ) values are shown below.

| 8.53Å | 6.12 | 1.486 |
|---|---|---|
| 4.26 | 5.45 | 1.463 |
| 4.18 | 5.12 | |
| 7.92 | 4.80 | |
| 6.73 | 3.06 | |
| 6.40 | 2.52 | |

A chemical formula determined by the chemical analysis is as follows.

$$Zn_{1.02}Al_4(OH)_{12.4}(SO_4)_{0.82} \cdot 3.5H_2O$$

Example 2

20 g of disodium hydrogenphosphate (Na$_2$HPO$_4$· 12H$_2$O) of the first class grade was dissolved in deionized water, and after the total volume was adjusted to 600 ml, the solution was put in a 1-L beaker and held at a temperature of 35° C. While the solution was stirred by a homomixer, 23 g of the synthetic chalcoalumite compound obtained in Example 1 was added, and the mixture was subjected to reaction at 35° C. for 30 minutes. The reaction mixture was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.56Å | 6.13 | 1.486 |
| 4.26 | 5.46 | 1.463 |
| 4.18 | 5.12 | |
| 7.91 | 4.80 | |
| 6.72 | 3.06 | |
| 6.40 | 2.52 | |

A chemical formula determined by the chemical analysis is as follows.

$$Zn_{0.88}Al_4(OH)_{12.24}(SO_4)_{0.48}(HPO_4)_{0.28} \cdot 2.6H_2O$$

Example 3

11.3 g of potassium chromate (K$_2$CrO$_4$) of the first class grade was dissolved in deionized water, and after the total volume was adjusted to 600 ml, the solution was put in a 1-L beaker and held at a temperature of 35° C. While the solution was stirred by a homomixer, 23 g of the synthetic chalcoalumite compound obtained in Example 1 was added, and the mixture was subjected to reaction at 35° C. for 30 minutes. The reaction mixture was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.54Å | 6.14 | 1.486 |
| 4.27 | 5.46 | 1.463 |
| 4.19 | 5.13 | |
| 7.92 | 4.80 | |
| 6.74 | 3.06 | |
| 6.40 | 2.52 | |

A chemical formula determined by the chemical analysis is as follows.

$$Zn_{0.94}Al_4(OH)_{12.12}(SO_4)_{0.66}(CrO_4)_{0.20}(CO_3)_{0.02} \cdot 2.2H_2O$$

Example 4

14.4 g of zinc sulfate (ZnSO$_4$·7H$_2$O) of the first class grade and 34.2 g of aluminum sulfate (Al$_2$(SO$_4$)$_3$) of the first class grade were dissolved in deionized water, and after the total volume was adjusted to 500 ml, the solution was put in a 1-L beaker. While the solution was vigorously stirred by a homomixer, 177 ml of 3.4N solution of NaOH of the first class grade was added at room temperature, and the mixture was stirred for about 30 minutes. The pH of the resultant coprecipitate suspension was 6.54 (28° C.). The suspension was then transferred into a 0.98-L autoclave apparatus and subjected to hydrothermal reaction at 130° C. for 4 hours. The pH of the suspension after being cooled was 4.49 (25.3° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.56Å | 6.14 | 1.486 |
| 4.27 | 5.47 | 1.463 |
| 4.19 | 5.13 | |
| 7.92 | 4.81 | |
| 6.73 | 3.06 | |
| 6.40 | 2.52 | |

A chemical formula determined by the chemical analysis is as follows.

$$Zn_{0.88}Al_4(OH)_{12}(SO_4)_{0.88} \cdot 3.1H_2O$$

Example 5

5.3 g of sodium carbonate (Na$_2$CO$_3$) of the first class grade was dissolved in deionized water, and after the total volume was adjusted to 600 ml, the solution was put in a 1-L beaker and held at a temperature of 35° C. While the solution was stirred by a homomixer, 22.6 g of the synthetic chalcoalumite compound obtained in Example 6 was added, and the mixture was subjected to reaction at 35° C. for 30 minutes. The reaction mixture was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis. The result of the XRD measurement was shown in FIG. 1.

| Main dÅ values by the XRD measurement | | |
|---|---|---|
| 8.53Å | 6.13 | 1.486 |
| 4.26 | 5.46 | 1.463 |
| 4.18 | 5.12 | |
| 7.91 | 4.79 | |
| 6.72 | 3.06 | |
| 6.40 | 2.52 | |

A chemical formula determined by the chemical analysis is as follows.

$Zn_{0.82}Al_4(OH)_{12.68}(SO_4)_{0.32}(CO_3)_{0.16} \cdot 1.8H_2O$

Example 6

3.75 g of copper sulfate ($CuSO_4 \cdot 5H_2O$) of the first class grade, 10.1 g of zinc sulfate ($ZnSO_4 \cdot 7H_2O$) of the first class grade and 34.2 g of aluminum sulfate ($Al_2(SO_4)_3$) of the first class grade were dissolved in deionized water, the total volume was adjusted to 500 ml, and the solution was put in a 1-L beaker. While the solution was vigorously stirred by a homomixer, 177 ml of 3.4N solution of NaOH of the first class grade was added at room temperature, and the mixture was stirred for about 30 minutes. The pH of the resultant coprecipitate suspension was 6.43 (26° C.). The suspension was then transferred into a 0.98-L autoclave apparatus and subjected to hydrothermal reaction at 130° C. for 6 hours. The pH of the suspension after being cooled was 4.51 (27.4° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.56Å | 6.13 | 1.486 |
| 4.27 | 5.48 | 1.463 |
| 4.19 | 5.15 | |
| 7.96 | 4.80 | |
| 6.74 | 3.06 | |
| 6.43 | 2.52 | |

A chemical formula determined by the chemical analysis is as follows.

$(Zn_{0.68}Cu_{0.30})Al_4(OH)_{12.44}(SO_4)_{0.72}(CO_3)_{0.04} \cdot 3.2H_2O$

Example 7

9.2 g of zinc sulfate ($ZnSO_4 \cdot 7H_2O$) of the first class grade, 6.7 g of nickel chloride ($NiCl_2 \cdot 6H_2O$) of the first class grade and 34.2 g of aluminum sulfate ($Al_2(SO_4)_3$) of the first class grade were dissolved in deionized water, the total volume was adjusted to 500 ml, and the solution was put in a 1-L beaker. While the solution was vigorously stirred by a homomixer, 182 ml of 3.4N solution of NaOH of the first class grade was added at room temperature, and the mixture was stirred for about 30 minutes. The pH of the resultant coprecipitate suspension was 6.57 (26.5° C.). The suspension was then transferred into a 0.98-L autoclave apparatus and subjected to hydrothermal reaction at 130° C. for 12 hours. The pH of the suspension after being cooled was 4.10 (25.7° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.58Å | 6.14 | 1.486 |
| 4.28 | 5.47 | 1.463 |
| 4.19 | 5.11 | |
| 7.94 | 4.82 | |
| 6.71 | 3.06 | |
| 6.38 | 2.52 | |

A chemical formula determined by the chemical analysis is as follows.

$(Zn_{0.62}Ni_{0.52})Al_4(OH)_{12.36}(SO_4)_{0.96} \cdot 2.9H_2O$

Example 8

10.1 g of zinc sulfate ($ZnSO_4 \cdot 7H_2O$) of the first class grade, 3.6 g of cobalt chloride ($CoCl_2 \cdot 6H_2O$) of the first class grade and 34.2 g of aluminum sulfate ($Al_2(SO_4)_3$) of the first class grade were dissolved in deionized water, the total volume was adjusted to 500 ml, and the solution was put in a 1-L beaker. While the solution was vigorously stirred by a homomixer, 177 ml of 3.4N solution of NaOH of the first class grade was added at room temperature, and the mixture was stirred for about 30 minutes. The pH of the resultant coprecipitate suspension was 6.69 (27.3° C.) The suspension was then transferred into a 0.98-L autoclave apparatus and subjected to hydrothermal reaction at 130° C. for 4 hours. The pH of the suspension after being cooled was 4.47 (30° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.55Å | 6.14 | 1.486 |
| 4.27 | 5.47 | 1.463 |
| 4.19 | 5.13 | |
| 7.92 | 4.80 | |
| 6.73 | 3.06 | |
| 6.41 | 2.52 | |

A chemical formula determined by the chemical analysis is as follows.

$(Zn_{0.68}Co_{0.28})Al_4(OH)_{12.2}(SO_4)_{0.86} \cdot 2.8H_2O$

Example 9

700 ml of 0.166 mol/L aqueous solution of aluminum sulfate of the first class grade was put in a 1-L beaker. While the solution was vigorously stirred by a homomixer, 4.73 g of zinc oxide on the market and 18 g of magnesium hydroxide on the market were added at room temperature, and the mixture was stirred for about 30 minutes. The pH of the resultant coprecipitate suspension was 6.98 (28.8° C.). The suspension was then transferred into a 0.98-L autoclave apparatus and subjected to hydrothermal reaction at 120° C. for 6 hours. The pH of the suspension after being cooled was 6.30. The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.50Å | 6.13 | 1.486 |
| 4.26 | 5.47 | 1.463 |
| 4.18 | 5.14 | |
| 7.92 | 4.79 | |
| 6.74 | 3.06 | |
| 6.38 | 2.52 | |

A chemical formula determined by the chemical analysis is as follows.

$(ZnMg_{0.02})Al_4(OH)_{12.88}(SO_4)_{0.58} \cdot 2.1H_2O$

Example 10

600 ml of 0.20 mol/L aqueous solution of aluminum sulfate of the first class grade was put in a 1-L beaker. While the solution was vigorously stirred by a homomixer, 24.41 g of zinc oxide on the market was added at room temperature, and the mixture was stirred for about 30 minutes. The pH of the resultant coprecipitate suspension was 6.03 (25.1° C.). The suspension was then transferred into a 0.98-L autoclave apparatus and subjected to hydrothermal reaction at 120° C. for 4 hours. The pH of the suspension after being cooled was 4.23 (25.4° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.56Å | 6.11 | 1.486 |
| 4.27 | 5.48 | 1.463 |
| 4.18 | 5.12 | |
| 7.95 | 4.78 | |
| 6.71 | 3.06 | |
| 6.40 | 2.52 | |

A chemical formula determined by the chemical analysis is as follows.

$Zn_{0.34}Al_4(OH)_{10.56}(SO_4)_{1.06} \cdot 3.6H_2O$

Example 11

600 ml of 0.158 mol/L aqueous solution of aluminum sulfate of the first class grade was put in a 1-L beaker. While the solution was vigorously stirred by a homomixer, 24.41 g of zinc oxide on the market was added at room temperature, and the mixture was stirred for about 30 minutes. The pH of the resultant coprecipitate suspension was 6.76 (27.5° C.). The suspension was then transferred into a 0.98-L autoclave apparatus and subjected to hydrothermal reaction at 120° C. for 6 hours. The pH of the suspension after being cooled was 4.86 (22.4° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.50Å | 6.10 | 1.486 |
| 4.25 | 5.46 | 1.463 |
| 4.18 | 5.10 | |
| 7.91 | 4.79 | |
| 6.70 | 3.06 | |
| 6.40 | 2.52 | |

A chemical formula determined by the chemical analysis is as follows.

$Zn_{1.5}Al_4(OH)_{12.92}(SO_4)_{1.04} \cdot 3H_2O$

Example 12

Since the pH in formation of chalcoalumite compounds is in an equilibrium state at the acidic side, their solubility in water is high. Therefore, in some uses, it is necessary to control their solubility in water. The control can be carried out by displacing part of the anions such as $SO_4^{2-}$ in a chalcoalumite compound, for example with $CO_3^{2-}$ or the like. In order to demonstrate this specifically, the solubilities in water of the synthetic chalcoalumite compounds of the invention obtained in Examples 4 and 5 were compared.

(Test Method)

100 ml of deionized water and 1.00 g of a sample (a synthetic chalcoalumite compound) are put in a 300-ml Erlenmeyer flask with ground stopper, and the flask was stopped tightly and shaken at 30° C. for 1 hour. The contents are separated into solid and liquid by a centrifuge, and the supernatant is recovered. The amount (ppm) of ions eluted in the supernatant was quantitatively determined by a high frequency induction combination-type plasma analysis method.

(Results)

The results were shown in the following table. It is seen from this that by displacing part of $SO_4^{2-}$ in the synthetic chalcoalumite compound with $CO_3^{2-}$, its solubility in water is fairly reduced.

TABLE 2

| Sample | Eluted amount (PPM) | | | | |
|---|---|---|---|---|---|
| | Zn ion | Cu ion | Al ion | $SO_4$ ion | pH value (25° C.) |
| $Zn_{0.88}Al_4(OH)_{12}(SO_4)_{0.88} \cdot 3.1 H_2O$ (Example 4) | 28.0 | | 0.05 or less | 40.3 | 5.70 |
| $Zn_{0.82}Al_4(OH)_{12.68}(SO_4)_{0.32}(CO_3)_{0.16} \cdot 1.8 H_2O$ (Example 5) | 0.9 | | 0.05 or less | 7.1 | 7.62 |
| $CuAl_4(OH)_{12.36}(SO_4)_{0.82} \cdot 2.5 H_2O$ (Reference example 1) | | 22.5 | 0.09 | 26.9 | 5.37 |

Example 13

Zinc sulfate ($ZnSO_4 \cdot 7H_2O$) and aluminum sulfate each of the first class grade were dissolved in deionized water to give a proper amount of a mixed solution containing 0.16 mol/L zinc sulfate and 0.32 mol/L aluminum sulfate, and a proper amount of 3.4N aqueous sodium hydroxide solution was prepared. 500 ml of deionized water was put in a reaction vessel (capacity: about 1 L) from which a reaction suspension can be taken out continuously, the mixed solution of zinc sulfate and aluminum sulfate and the sodium hydroxide solution were simultaneously poured therein under stirring using quantitative pumps, and while the pH of the reaction suspension was maintained 6.0±0.2 (liquid temperature: 32° C.±1° C.), the reaction was continued for 3 hours. 700 ml of the reaction suspension was filtered, the filter cake (coprecipitate) was washed with water, and deionized water was added to the coprecipitate to make the total volume 700 ml. The suspension was transferred into a 0.98-L autoclave apparatus and subjected to hydrothermal reaction at 130° C. for 4 hours. The pH of the suspension after being cooled was 4.20 (28° C.). The suspension was filtered, the filter cake was washed with water, and the filter cake and 600 ml of deionized water were put in a 1-L beaker, made to be a suspension by a stirrer and heated to 80° C. A solution obtained by putting 2.4 g of sodium stearate (purity: 86%) and 150 ml of deionized water in a 200-ml beaker and heating the mixture to about 80° C. was poured in the suspension, and the mixture was held at 80° C. for 30 minutes. The mixture was filtered, and the filter cake was washed with water and dried at 75° C. for 24 hours, and the dried matter was ground and sieved using a 100 mesh stainless steel net. The resultant dry powder exhibited strong hydrophobicity, and when it was put in water, followed by stirring, it did not exhibit affinity to water and floated on the water.

The product was ascertained to be a chalcoalumite compound by XRD measurement and chemical analysis.

| Main dÅ values by the XRD measurement | |
|---|---|
| 8.54Å | 5.46 |
| 4.27 | 5.11 |
| 4.19 | 4.80 |
| 7.90 | 3.06 |
| 6.72 | 2.52 |
| 6.40 | 1.486 |
| 6.12 | 1.463 |

A chemical formula determined by the chemical analysis is as follows.

$$Zn_{0.92}Al_4(OH)_{12.1}(SO_4)_{0.87} \cdot 3.1H_2O \text{ (containing 5.3\% stearic acid)}$$

Reference Example 1

12.5 g of copper sulfate ($CuSO_4 \cdot 5H_2O$) of the first class grade and 34.2 g of aluminum sulfate ($Al_2(SO_4)_3$) of the first class grade were dissolved in deionized water to make the total volume 500 ml. While the solution was strongly stirred by a homomixer, 182 ml of 3.31N solution of NaOH of the first class grade was poured therein at room temperature, and the mixture was stirred for about 20 minutes. The pH of the resultant coprecipitate suspension was 6.53 (27.8° C.). The suspension was then transferred into a 0.98-L autoclave apparatus and subjected to hydrothermal reaction at 130° C. for 4 hours. The pH of the suspension after being cooled was 5.16 (22.9° C.). The suspension was filtered under reduced pressure, and the filter cake was washed with water, washed with acetone and dried at 75° C. for 15 hours. The cake after being dried was ground and sieved using a 100 mesh sieve.

The product was ascertained to be a chalcoalumite compound by XRD measurement and chemical analysis.

| Main dÅ values by the XRD measurement | | |
|---|---|---|
| 8.51Å | 6.11 | 1.486 |
| 4.25 | 5.45 | 1.463 |
| 4.18 | 5.11 | |
| 7.92 | 4.80 | |
| 6.72 | 3.06 | |
| 6.40 | 2.52 | |

A chemical formula determined by the chemical analysis is as follows.

$$CuAl_4(OH)_{12.36}(SO)_{0.82} \cdot 2.5H_2O$$

Figure 1:
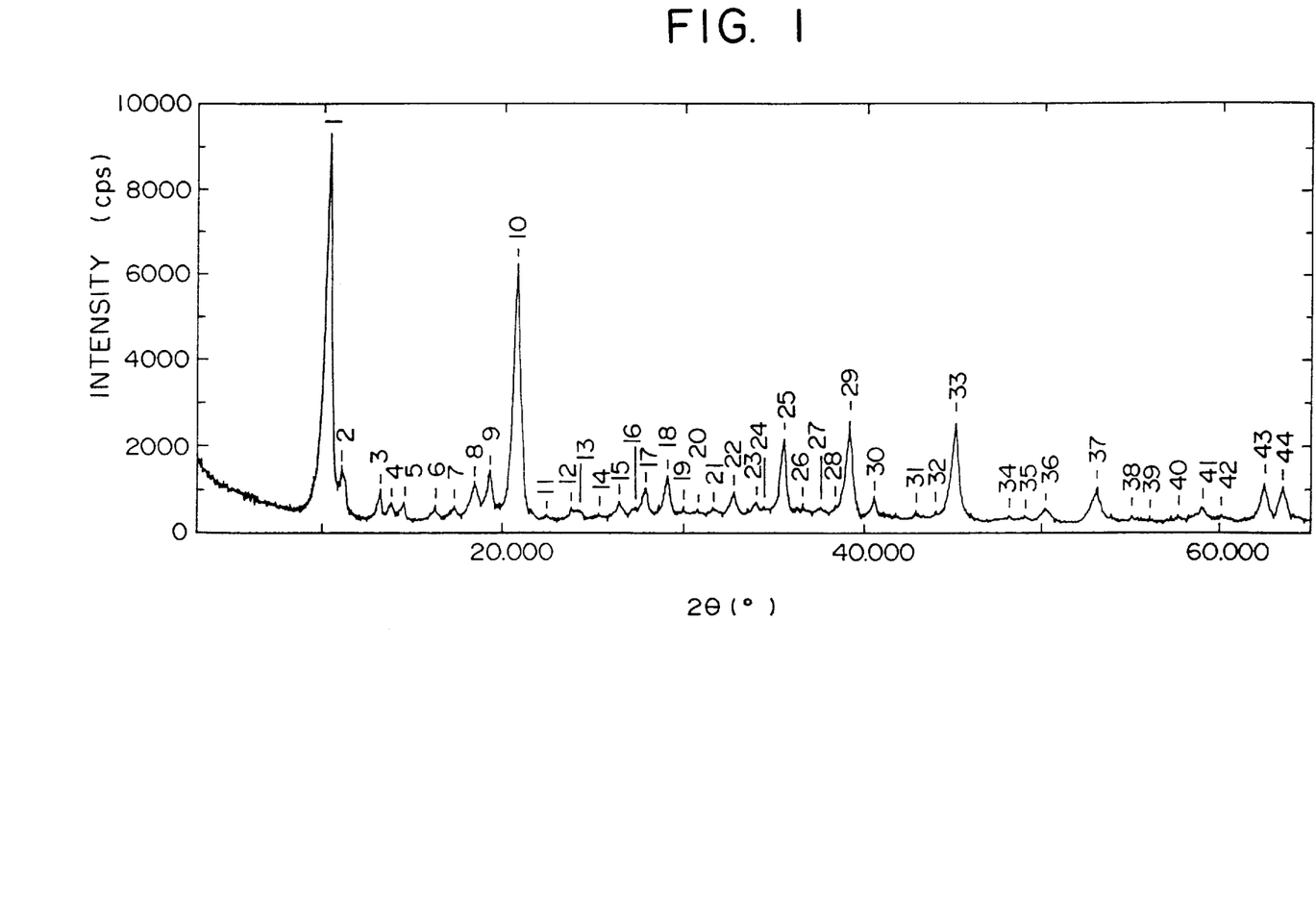
FIG. 1 is an XRD measurement chart of the synthetic chalcoalumite compound of Example 5.
Figure 3:
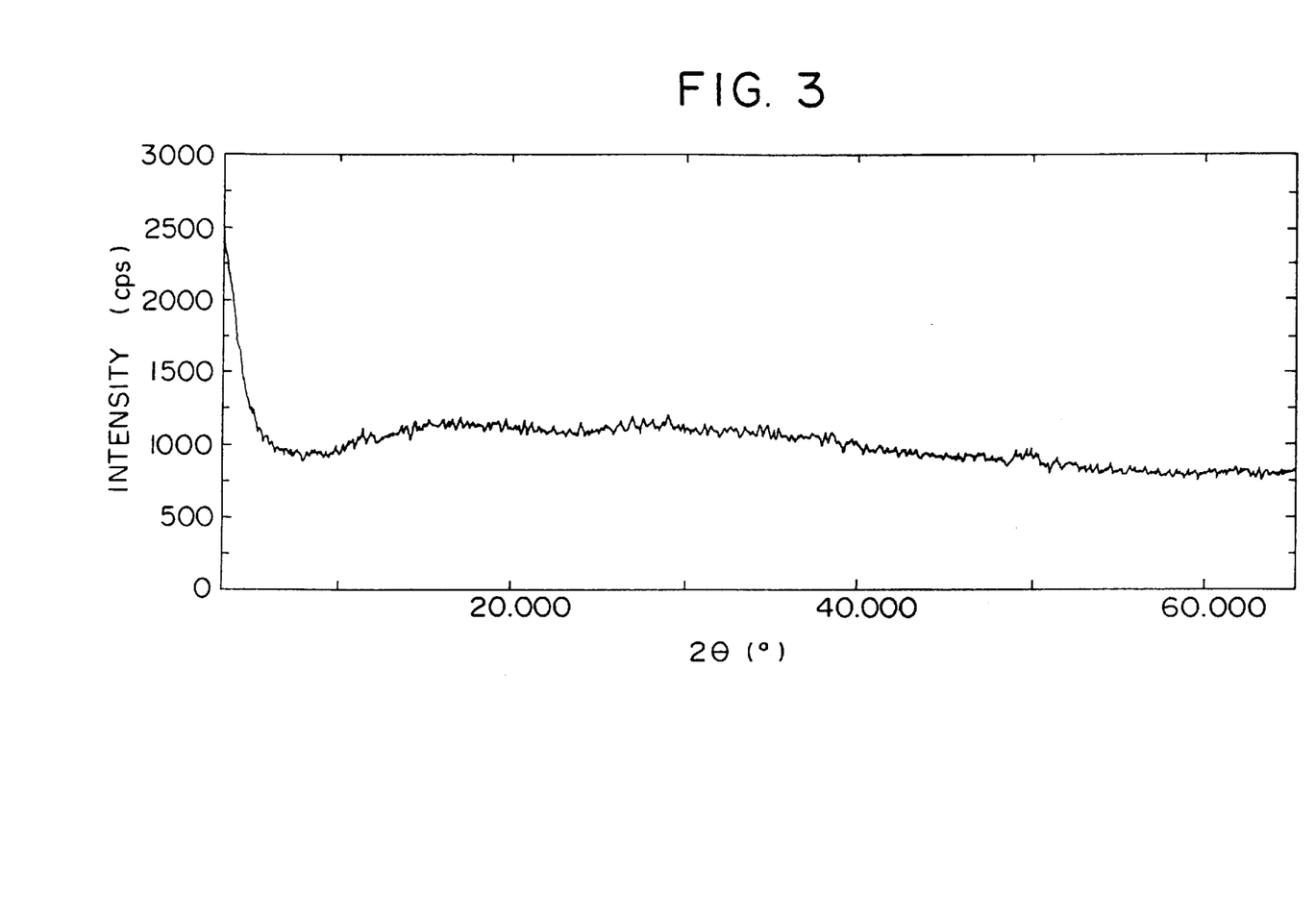
FIG. 3 is an XRD measurement chart of a product obtained by treating the chalcoalumite compound of Reference example 1 in the same manner as in Example 5.

The above chalcoalumite compound was treated in the same manner as in Example 5. The XRD chart (diffraction X-ray chart) of the resultant product was shown in FIG. 3. As apparent from FIG. 3, when the chalcoalumite compound of Reference example 1 was treated in the same manner as in Example 5, its crystal structure was destroyed. On the other hand, it is apparent that when the chalcoalumite compound of the invention was treated with sodium carbonate, its crystal structure was maintained, as shown in FIG. 1, and it is much stabler than the chalcoalumite compound of Reference example 1.

What is claimed is:

1. A synthetic chalcoalumite compound represented by the formula (1)

$$(Zn_{a-x}^{2+}M_x^{2+})Al_4^{3+}(OH)_b(A^{n-})_c \cdot mH_2O \qquad (1)$$

wherein

M represents at least one of Cu, Ni, Co and Mg, a represents 0.3<a<2.0, x represents 0≦x<1.0, b represents 10<b<14, $A^{n-}$ represents one or two selected from the group consisting of $SO_4^{2-}$, $HPO_4^{2-}$, $CO_3^{2-}$, $CrO_4^{2-}$, $SiO_3^{2-}$, $SO_3^{2-}$, $NO_3^-$, $OH^-$ and $Cl^-$, c represents 0.4<c<2.0 and m represents a number of 1 to 4.

2. The synthetic chalcoalumite compound according to claim 1 wherein the synthetic chalcoalumite compound of the formula (1) according to claim 1 is surface treated with at least one surface-treating agent selected from the group consisting of higher fatty acids, anionic surfactants, phosphoric esters, silanes, titanates and aluminum coupling agents.

3. A process for producing a synthetic chalcoalumite compound according to claim 1 which comprises subjecting a water soluble aluminum salt, a zinc compound which is water soluble in the pH range of about 4 to about 7, and optionally, a compound of one or more elements selected from the group consisting of Ni, Cu, Co and Mg which compound is water soluble in the pH range of about 4 to about 7, to coprecipitation reaction at a reaction pH of about 4 to about 7 and a temperature of about 10° to about 50° C., and then subjecting the coprecipitate to hydrothermal reaction at a reaction pH of the above-mentioned range and a temperature of about 80° to about 170° C.

4. A process for producing a synthetic chalcoalumite compound according to claim 1 which comprises producing a chalcoalumite compound of the formula (1) according to claim 1 wherein $A^{n-}$ is $SO_4^{2-}$, and then displacing part of $SO_4^{2-}$ of the compound with one anion selected from the group consisting of $HPO_4^{2-}$, $CO_3^{2-}$, $CrO_4^{2-}$, $SiO_3^{2-}$, $SO_3^{2-}$, $NO_3^-$, $OH^-$ and $Cl^-$.

5. A process for producing a synthetic chalcoalumite compound according to claim 1 which comprises reacting an aqueous solution of sulfates, nitrates or chlorides of one or more elements selected from the group consisting of Zn, Ni, Cu, Co, Mg and Al with one or more compounds selected from the group consisting of ammonia, sodium hydroxide, potassium hydroxide, magnesium hydroxide, magnesium oxide, sodium aluminate and zinc oxide, at a reaction pH of about 4 to about 7 and a temperature of about 80° to about 170° C. for about 1 to about 24 hours.

* * * * *